(12) United States Patent
Elabbady et al.

(10) Patent No.: US 7,483,958 B1
(45) Date of Patent: Jan. 27, 2009

(54) METHODS AND APPARATUSES FOR SHARING MEDIA CONTENT, LIBRARIES AND PLAYLISTS

(75) Inventors: Tarek Z. Elabbady, Redmond, WA (US); Shannon J. Chan, Bellevue, WA (US); James M. Alkove, Woodinville, WA (US); Sandeep S. Sahasrabudhe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 10/108,174

(22) Filed: Mar. 26, 2002

Related U.S. Application Data

(60) Provisional application No. 60/278,804, filed on Mar. 26, 2001.

(51) Int. Cl.
G06F 15/16 (2006.01)

(52) U.S. Cl. .................. 709/217; 709/218; 709/219; 709/231

(58) Field of Classification Search .............. 709/231, 709/200, 203, 217–219, 229, 230, 238; 705/50, 705/51, 59
See application file for complete search history.

(56) References Cited

U.S. PATENT DOCUMENTS

| | | | | |
|---|---|---|---|---|
| 6,349,340 B1 * | 2/2002 | Dyer et al. | ................... | 709/231 |
| 6,901,428 B1 * | 5/2005 | Frazier et al. | ............... | 709/203 |
| 6,993,664 B2 * | 1/2006 | Padole et al. | ................... | 705/59 |
| 7,065,527 B2 * | 6/2006 | McCartney et al. | ........... | 707/10 |
| 7,076,468 B2 * | 7/2006 | Hillegass et al. | .............. | 705/56 |
| 7,110,982 B2 * | 9/2006 | Feldman et al. | ............... | 705/51 |
| 7,136,866 B2 * | 11/2006 | Springer et al. | ............ | 707/102 |
| 2002/0052885 A1 * | 5/2002 | Levy | ........................... | 707/200 |
| 2002/0107973 A1 * | 8/2002 | Lennon et al. | .............. | 709/231 |
| 2002/0147771 A1 * | 10/2002 | Traversat et al. | ........... | 709/203 |
| 2003/0005135 A1 * | 1/2003 | Inoue et al. | ................. | 709/229 |
| 2003/0172131 A1 * | 9/2003 | Ao | ............................ | 709/219 |
| 2004/0249815 A1 * | 12/2004 | Lee | ............................... | 707/9 |
| 2006/0031551 A1 * | 2/2006 | Agresta et al. | .............. | 709/231 |

* cited by examiner

Primary Examiner—Saleh Najjar
Assistant Examiner—Faruk Hamza
(74) Attorney, Agent, or Firm—Lee & Hayes, PLLC

(57) ABSTRACT

Methods and systems suitable for sharing media content are provided. One system includes at least one media holder, at least one media cataloger, at least one user control point, at least one media player, and at least one network operatively connecting them. The media holder is configured to selectively output shared media metadata, media content and at least one corresponding media playing license over the network. The media cataloger is configured to receive the metadata identifying the shared media content that is available from the media holder(s). The media cataloger is configured to output at least one media catalog over the network. The media catalog identifies the shared media content that is available from the media holder(s). The user control point is configured to receive the media catalog(s) and request the shared media content as selected from the media catalog, for example, by a user. The user control point configures the media player to receive the media playing license and the media content over the network. The media player cannot play protected media content without having a proper license. The license may be withheld if certain authentication criteria are not met by the playing device. In certain implementations, the network includes a Universal Plug-and-Play network that allows the various devices to quickly integrate with one another without user intervention. The network also provides a robust environment, such that, e.g., media content sharing can easily be accomplished even if the media cataloger is not available.

22 Claims, 5 Drawing Sheets

METHODS AND APPARATUSES FOR SHARING MEDIA CONTENT, LIBRARIES AND PLAYLISTS

RELATED PATENT APPLICATIONS

This U.S. Non-provisional application for Letters Patent claims the benefit of priority from, and hereby incorporates by reference the entire disclosure of, co-pending U.S. Provisional application for Letters Patent Ser. No. 60/278,804 filed Mar. 26, 2001.

TECHNICAL FIELD

This invention relates generally to networked computer and media reproduction devices, and more particularly to methods and systems for sharing media content between various devices.

BACKGROUND

Personal computers (PCs) are popular tools for playing and sharing digital music files and more recently digital video files. Downloading these and other types of media content files over the Internet is becoming more and more common, as a result of improved communication capabilities and advances in computer processing and data storage. Consumers also have more things to do with the media content once it has been downloaded. For example, consumers may choose to burn CDs or DVDs that can be replayed over stereos or televisions, respectively. Consumers are also able to port certain media files to digital audio players/receivers, such as, e.g., MP-3 devices that can easily be transported. Other popular digital media content tools include digital cameras (both still and video) and digital scanning devices, which can be used to produce media content that can be shared with others over the Internet.

A variety of digital audio content file sharing services are available over the Internet. Some of these early music swapping pioneers, such as, e.g., Napster, have successfully shown that consumers are excited about the prospects provided by online media content delivery. Some of services have also highlighted the continuing need to ensure that copyrighted media content is carefully protected.

There is also a movement underway to provide more enhanced home networking capabilities, for example, that allow consumers to interconnect various devices and/or appliances together and possibly with other devices over the Internet. One exciting possibility is providing consumers with the ability to manage and deliver media content to devices not only in their homes but in their automobiles and at work. With the rapid changes in wireless technology, what was once only a dream is quickly becoming a reality.

Consequently, there is a need for media content sharing methods and systems that take advantage of these and other technological improvements while also providing a responsible and user-friendly networking environment.

SUMMARY

The above stated needs and others are satisfied, for example, by a system suitable for sharing media content between a plurality of different types of devices. In accordance with certain exemplary implementations of the present invention, the system includes at least one media holder, at least one media cataloger, at least one user control point, at least one media player, and at least one network operatively connecting them.

The media holder is configured to selectively output shared media metadata, media content and at least one corresponding media playing license over the network. The media cataloger is configured to receive the metadata identifying the shared media content that is available from the media holder(s). The media cataloger is configured to output at least one media catalog over the network. The media catalog contains metadata identifying the shared media content that is available from the media holder(s). The user control point is configured to receive the media catalog(s) and request the shared media content as selected from the media catalog, for example, by a user. The user control point configures the media player to receive the media playing license and the media content over the network.

The media player cannot play protected media content without having a proper media content playing license. The license may be withheld if certain authentication criteria are not met by the playing device and/or user.

In certain implementations, the network includes a Universal Plug-and-Play network that allows the various devices, both wired and wireless devices, to quickly integrate with one another without user intervention. The network also provides a robust environment, such that, e.g., media content sharing can easily be accomplished even if the media cataloger is not available.

BRIEF DESCRIPTION OF THE DRAWINGS

A more complete understanding of the various methods and systems of the present invention may be had by reference to the following detailed description when taken in conjunction with the accompanying drawings wherein.

DETAILED DESCRIPTION

Figure 1:
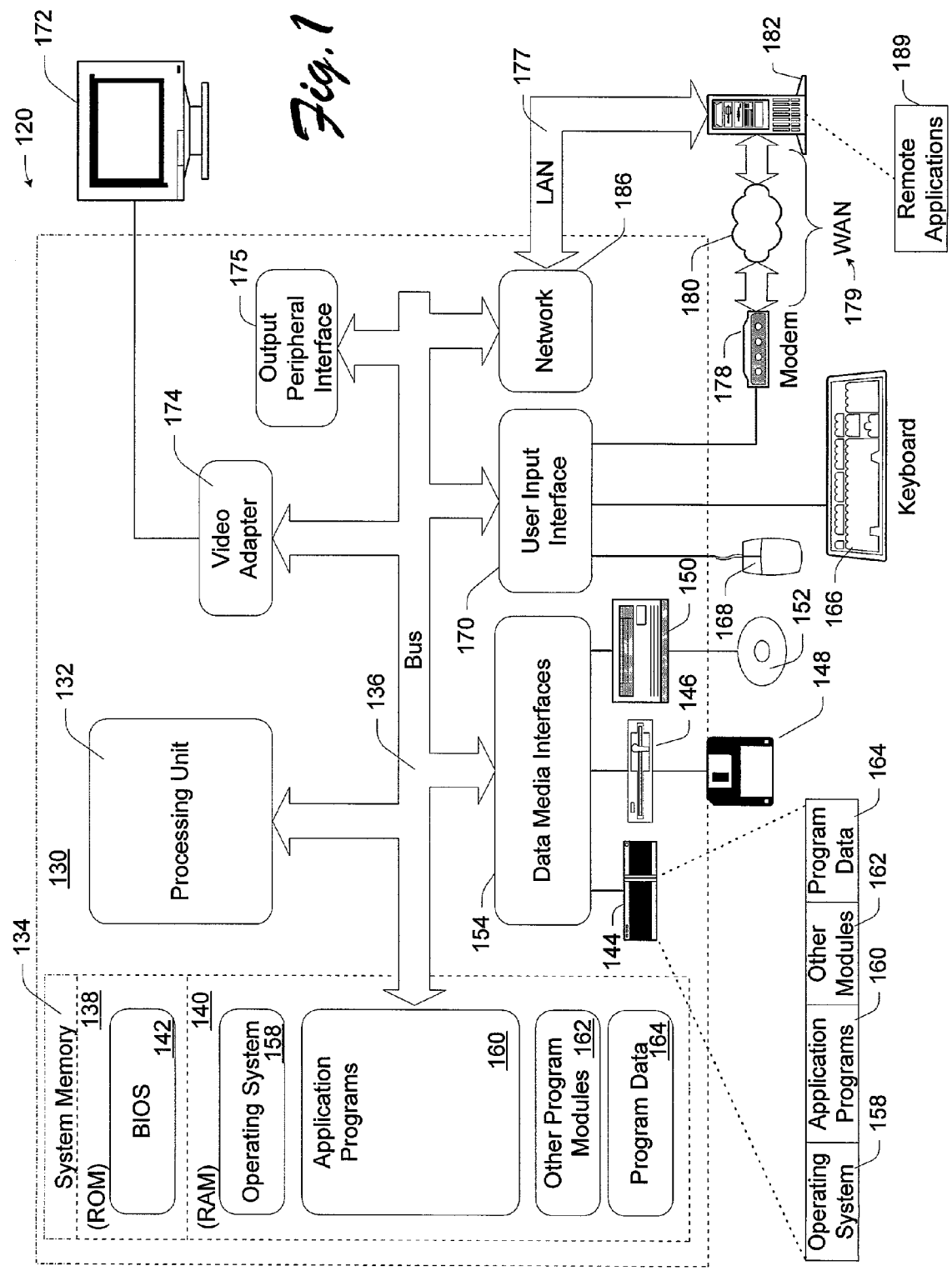
FIG. 1 is a block diagram generally illustrating an exemplary computer system suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and systems may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like. The methods and systems may also be implemented, for example, using various media processing devices such as desktop computing devices, notebook computing devices, tablet computing devices, hand-held computing devices, personal digital assistant (PDA) devices, electronic paper devices, electronic book devices, wearable computing devices, digital audio receiver (DAR) devices, digital audio player devices, digital audio recording devices, automobile-based media player devices, digital television devices, digital video player devices, digital versatile disc (DVD) player devices; set top box devices, digital video receiver devices, digital video recording devices, wireless communication devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN)

179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2A:
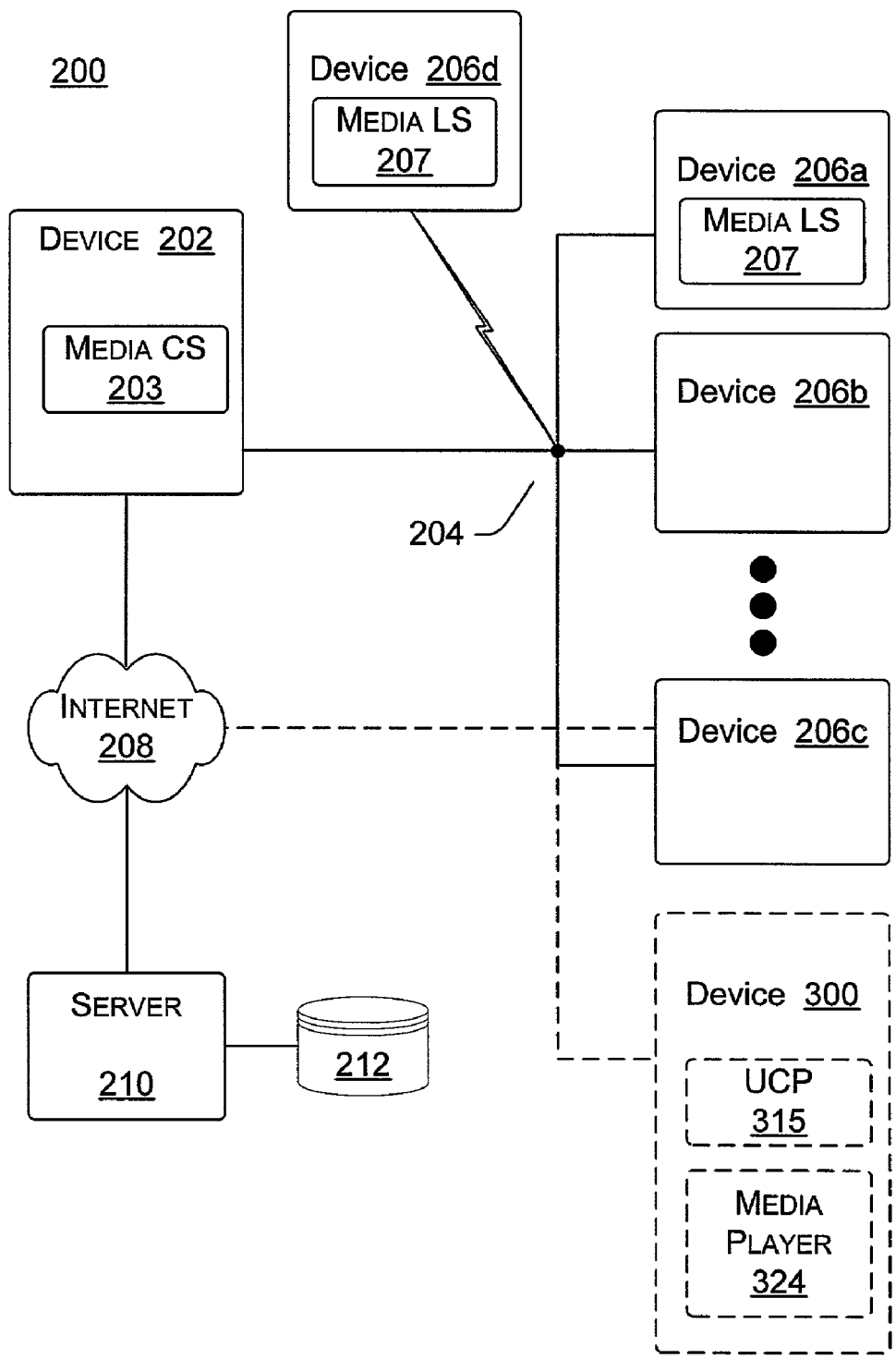
FIG. 2A is a block diagram depicting a media content sharing environment having a plurality of networked devices including one device configured to provide a media cataloging service (CS) and other devices configured to provide media library services (LSs), in accordance with certain exemplary implementations of the present invention.

Attention is now drawn FIG. 2A, which is a block diagram depicting a media content sharing environment 200 having a plurality of networked devices including a first device 202 that is configured to provide a media cataloging service (CS) over a network 204 with/for other devices 206a-d that are configured to act as media players and/or provide media library services (LSs), in accordance with certain exemplary implementations of the present invention.

In this example first device 202 is further operatively coupled to the Internet 208, which provides connectivity to at least one server 210. Here, server 210 is coupled to media content sharing mechanism that is represented by a database 212. Server 210 may, for example, be configured to provide an Internet-based service, such as, a media controller service, a media provider service, a radio program service, a television service, or the like. Device 206c is illustrated as also having the ability to operatively connect to the Internet 208 through communication link 207. Other devices, such as devices 206a, 206b and/or 206d may also have similar connectivity to the Internet 208. For example, network 204 may be connected to the Internet 208 through one or more other devices (not shown).

Network 204 is representative of any communication system/equipment that can provide the necessary data communication path between the various devices connected through it. Thus, network 204 may include wired and/or wireless connections. In certain implementations network 204 includes an Internet Protocol (IP) based network. To better control the sharing of media content, in certain implementations network 204 includes a local area network (LAN).

One such implementation, in accordance with certain preferred implementations, includes the use of a Universal Plug-and-Play (UPnP) protocol that provides a peer-to-peer network capability that can support various devices through wired and/or wireless connections. UPnP provides a distributed, open networking architecture that leverages Transmission Control Protocol (TCP/IP) and World Wide Web (WWW) features to enable seamless proximity networking in addition to control and data transfer among networked devices in a home, office, or other like environment(s). UPnP advantageously boasts device-driver independence and zero-configuration networking.

Devices 202, 206a-d (and later devices 202', 206e-h, and 300) are representative of a variety of different devices that can be used to provide features/capabilities associated with sharing media content in accordance with the methods and systems provided herein. An exemplary list of some of the types of devices that may be used was provided earlier. Those skilled in the art will recognize other devices that can also be used, including special purpose devices.

As depicted in FIG. 2A, device 202 is operatively configured to provide a media catalog service 203. Media catalog service (CS) 203 is configured to gather and/or distribute information about media content that is available for sharing between at least some of the connected devices. Thus, for example, in certain implementations media CS 203 may actively/dynamically query the various devices to gather information about shared media content and/or passively receive such information from the various devices.

In a UPnP environment, media CS 203 can employ the capabilities provided by the UPnP protocol to dynamically discover and gather (e.g., aggregate) shared media content information. Media CS 203 can then publish at least a portion of the resulting aggregated information, e.g., as a corresponding media catalog, over at least network 204. The media catalog may be provided in a format for displaying in a user interface or like mechanism.

The shared media content information that is gathered by media CS 203 may include any type of data that may be helpful in the sharing process for the user of the media playing device and/or the various services/functions provided within the various devices and/or network 204. With this in mind, in certain implementations the shared media content information includes metadata associated with the media content. The metadata may include, for example, media content location information, media content format information and media content descriptive information. The media content location information can include at least one location identifier, such as, e.g., a uniform naming convention (UNC) identifier and/or a unified resource locator (URL) identifier.

Media CS 203, in this example, is configured to convert at least a portion of the received metadata to produce the media catalog in the form of a markup language file. There exist a variety of markup languages that may be employed to provide the media catalog; some of the markup languages may be better suited for certain environments/devices. Some exemplary markup languages would include HyperText Markup Language (HTML), Standard Generalized Markup Language (SGML), Extensible HyperText Markup Language (XHTML), Extensible Markup Language (XML), Wireless Markup Language (WML), Handheld Device Markup Language (HDML), ColdFusion Markup Language (CFML), and Compact HyperText Markup Language (CHTML). The preferred markup language in the examples provided herein is XML. Media CS 203 may also employ the use of a scripting language, such as, e.g., JScript, VBScript, Perl, and the like.

In accordance with certain implementations of the present invention, device 202 includes a personal computer (PC) or like device and media CS 203 is configured to provide a centralized media cataloging capability. By essentially hosting such services, the PC offers a content management capability that can enhance its more common role as that of a media content storage device and/or media gateway device. Many PCs are already configured to provide/play various types of media. For example, many PCs are configured to run media player and/or Jukebox applications that allow the user to create a digital music library, play/store/locate digital media content and burn CDs/DVDs. Some of this digital media content may be downloaded over the Internet.

As used herein, the terms "media content" and/or just "media" are meant to refer to any form of information that may be shared, processed, and/or played or otherwise reproduced in some manner by one or more devices/services for the user to see, hear and/or interact with. Thus, by way of example, media content may include audio data, video data, image data, multimedia data, graphic data, textual data, graphical user interface (GUI) data, interactive programming data, computer game data, virtual reality data, and/or other similar types of data. In certain instances, the media content may also include metadata, some of which may be presented to the user.

Attention is now drawn to device 206a, which includes a media library service (LS) 207. A similar media LS 207 is also provided in device 206d, which as illustrated is connected to network 204 over a wireless connection.

Media LS 207 is configured in this example to operate in conjunction with media CS 203 to promote the sharing of media content between the various devices. Here, media LS 207 is configured to provide metadata to media CS 203 about media content that at least its host device has available for sharing. In this manner, media LS 207 generates at least one media library that can be provided to media CS 203 over network 204 and subsequently aggregated into, or otherwise used to create, the resulting media catalog.

In accordance with certain implementations, for example, device 206a and media LS 207 may further be configured to enhance an access control capability, a network firewall capability, and/or a content protection capability. Assume, for example, that network 204 is configured as a home network that employs UPnP protocols. Here, the "UPnP" devices on the home network would typically not be required to logon to a domain controller or the like. The access control lists (ACLS) could therefore be set to allow access by anonymous users. This means that any UPnP control device (control point) on the home network could access media LS 207. This also means that the home network may need to be protected against unauthorized access. In the case of Internet connectivity, therefore an Internet firewall or like capability should be provided for the home network. As such, in this example, it is preferred that the UPnP devices not be connected directly to the Internet, but rather through another device that provides for Internet connection sharing (ICS). The ICS configuration will act as a firewall, preventing unauthorized users from accessing the IP addresses of the various UPnP devices on the home network. With regard to FIG. 2A, it is assumed that device 202 provides an ICS or other like capability. Hence, the optional connection between the Internet 208 and device 206c is a dashed line because it may not be desirable in some situations.

It is preferred that media content sharing environment 200 be configured to provide appropriate protection for copyrighted media content that may be shared between the various networked devices. Thus, in accordance with certain implementations of the present invention, media LS 207 employs a media content license scheme that essentially requires that a proper license exists to process/play the media content. The media content license may be associated with an individual media content file or with multiple media content files. The media content license may also or alternatively be associated with a specific media holding/playing device or with multiple media holding/playing devices. The media content license may also or alternatively be associated with a specific entity or with multiple entities (e.g., groups). The term "entity" is meant to represent any identifiable account, user, group, organization, company, etc., that may in some way seek to use a device to hold and/or play or otherwise process media content.

Figure 3:
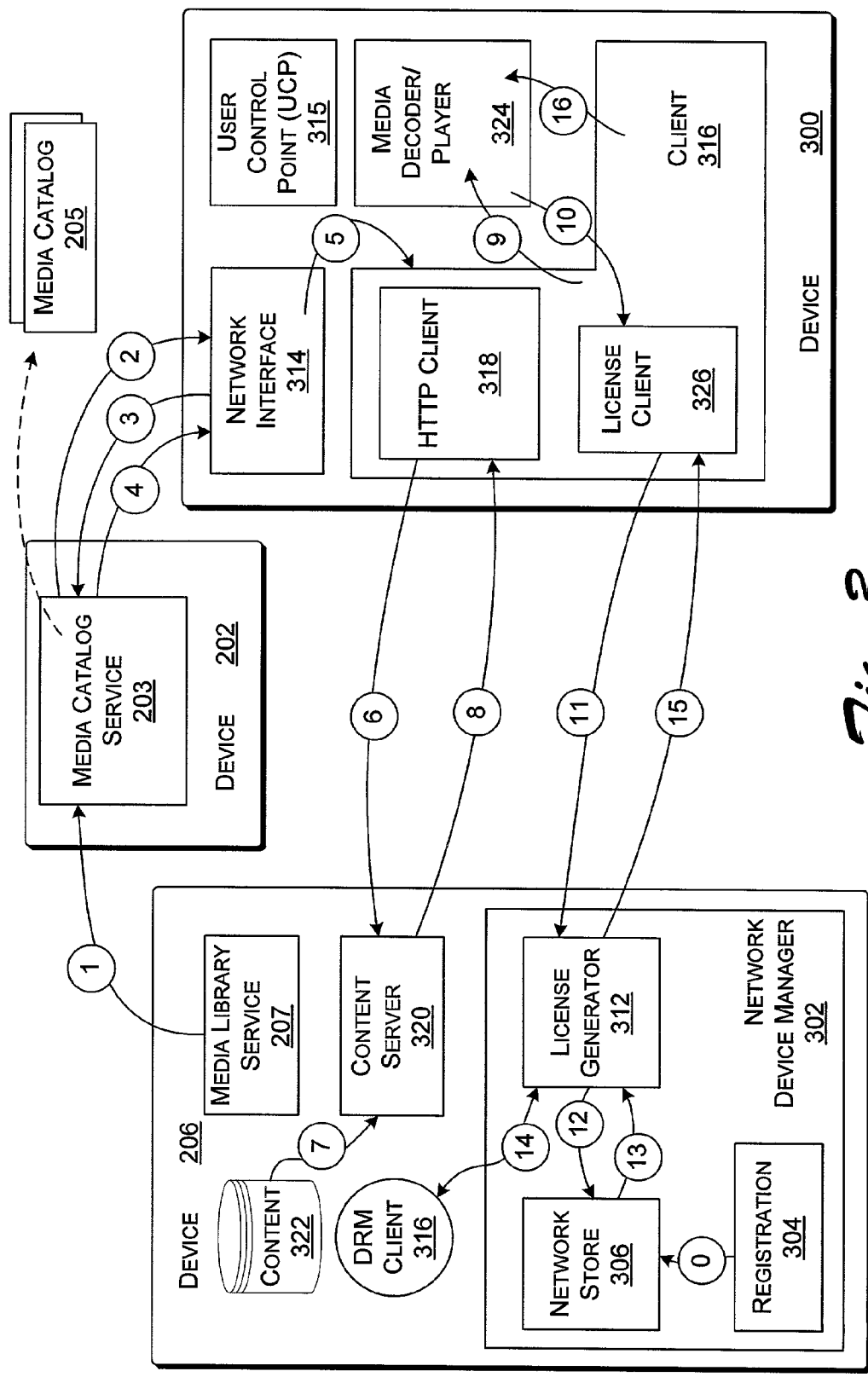
FIG. 3 is a block diagram illustrating certain features and/or functions associated with certain devices, e.g., as in FIGS. 1, and/or 2A-B, that are configured to share media content, in accordance with certain exemplary implementations of the present invention.
Figure 4:
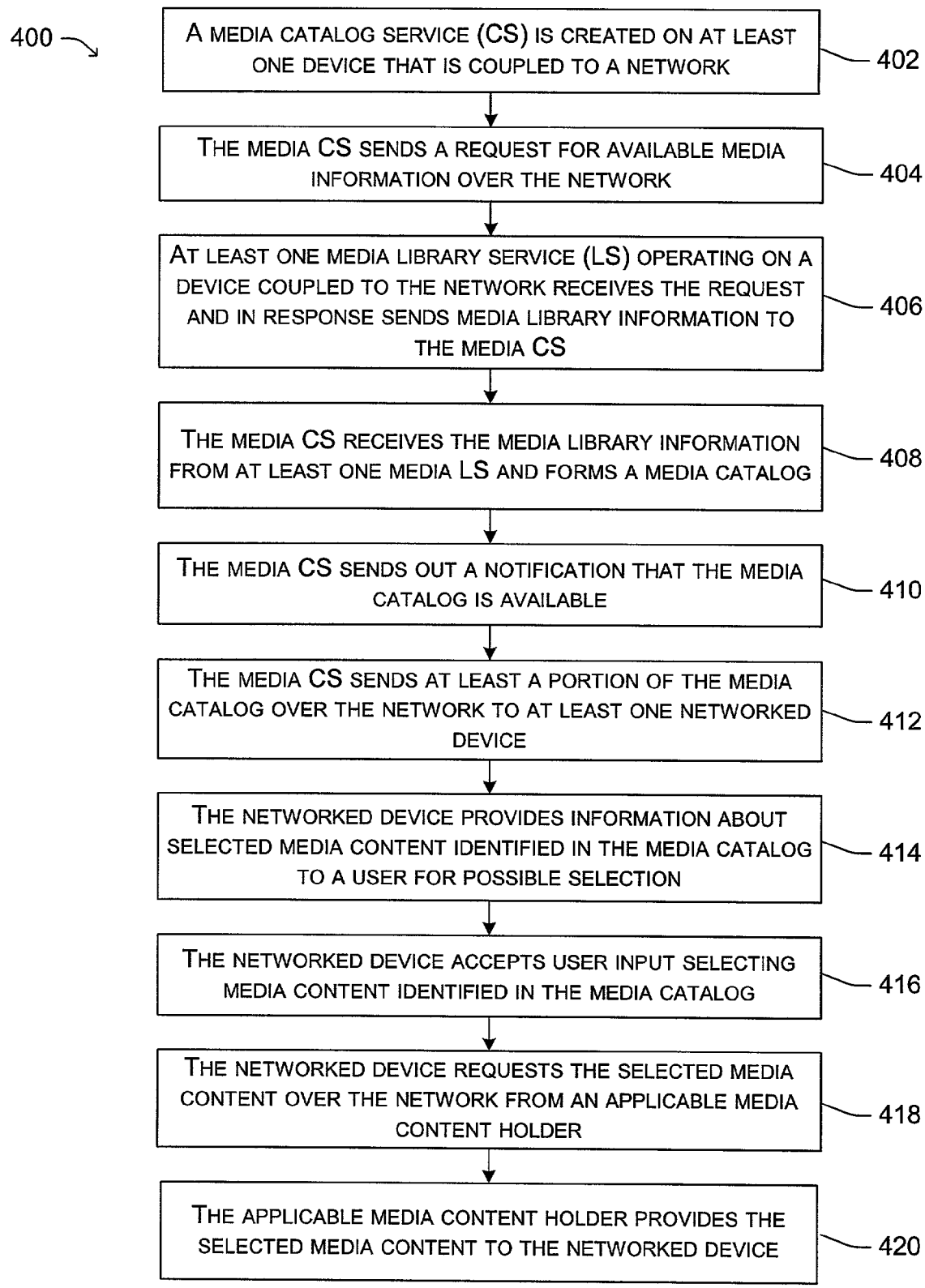
FIG. 4 is a flow diagram depicting a media sharing process, in accordance with certain exemplary implementations of the present invention.

An exemplary media content license scheme is described in subsequent sections with regard to FIGS. 3 and 4.

DRM is basically a set of technologies that media content owners can use to protect their copyrights. In most instances, DRM is a system that encrypts digital media content and limits access to only those people who have acquired a proper license to play the media content. By way of example, Microsoft® Windows Media™ Rights Manager provides an end-to-end DRM system that offers content providers and retailers a flexible platform for the secure distribution of digital media files. Currently, Windows Media™ Rights Manager includes both server and client software that enables applications to protect and play back digital media content files.

In certain exemplary implementations, the media playing license is associated with certain cryptographic keys, e.g., a license key and a key ID, wherein the license key is a secret seed value. When the user acquires protected media content it will be encrypted. As such, in order to play or otherwise process the media content as intended, the playing device will need to have a license that contains a key to decrypt the media content. If a valid license already exists on the device, then the media content plays as expected. If a valid license is not found, a license request will be made.

In certain exemplary implementations, a DRM license service on the media holder would use the original DRM license to issue a temporary DRM license. The original DRM license would specify the conditions and rights of the temporary DRM license. The system administrator of the media holder specifies who can access the DRM license service. The DRM license service enforces the policies specified by both the content publisher and the system administrator. Note that the DRM license service preferably runs on a trusted platform in order to ensure that the licensing conditions specified by the content publisher are enforced.

There are other exemplary implementations that do not require a trusted platform on the media holder. One media content license scheme, for example, utilizes an Internet Service Application Programming Interface (ISAPI) filtering process and a digital rights management (DRM) process configured to provide a Portable Media (PM) license service for shared media content. Another scheme uses a uDRM license to issue a UDL license.

In certain implementations, a clearing house would issue the licenses. When a license clearing house needs to issue a license for an encrypted file, it can recreate a key by retrieving the key ID from the file. The clearing house will download the key within an encrypted license to the device. In this exemplary scheme, the license itself includes the rights, or business rules, that govern the use of the media content file. As is well known, content owners may deliver such licenses to devices in different ways and at different times. For example, licenses can be delivered before or after the user has tried to play the media content file and licenses may be delivered with or without user interaction. Additionally, monetary fees may be assessed for certain licenses.

With attention once again to FIG. 2A, devices 206b and 206c are representative of media content playing devices. It should be noted, however, that one or more of devices 202, 206a and 206d may also provide media content playing. Device(s) 206b/c is configured to receive the media catalog from media CS 203 over network 204.

In certain instances, devices 206b/c may be further configured to receive media library data directly from a media LS 207 over network 204. Thus, in accordance with certain aspects of the present invention, it is possible to share media content between devices without the presence of media CS 203 on network By way of example, assume that device 206c is a digital audio receiver (DAR) and device 206a is a music jukebox device configured to share music content over network 204. Here, the media LS of the music jukebox will provide a media library of music files that may be shared over network 204. Device 206c upon connecting to network 204 can discover the media library and present media content information (e.g., metadata from the media library) to the user, for example, through a display screen. The user would then select one or more music files, a play list, or other grouping of music files. The DAR would then send a request for the selected media content to the music jukebox, which would send the selected media content to the DAR. The DAR checks if the media content requires a license. If a license is required, then the DAR determines if it already has a license. If the DAR does not have a license, then it requests a license from the license service on the music jukebox device. The license service verifies that a license(s) is available for the user/device/selected media content, and if so provide the license(s) (as applicable) to the DAR The transfer of the media content may occur in a variety of ways. For example, data transferring techniques such as file transfer protocol (FTP) techniques, streaming media techniques, progressive download techniques, and the like may be employed depending on the media content, the communication capability of the network(s), etc.

Figure 2B:
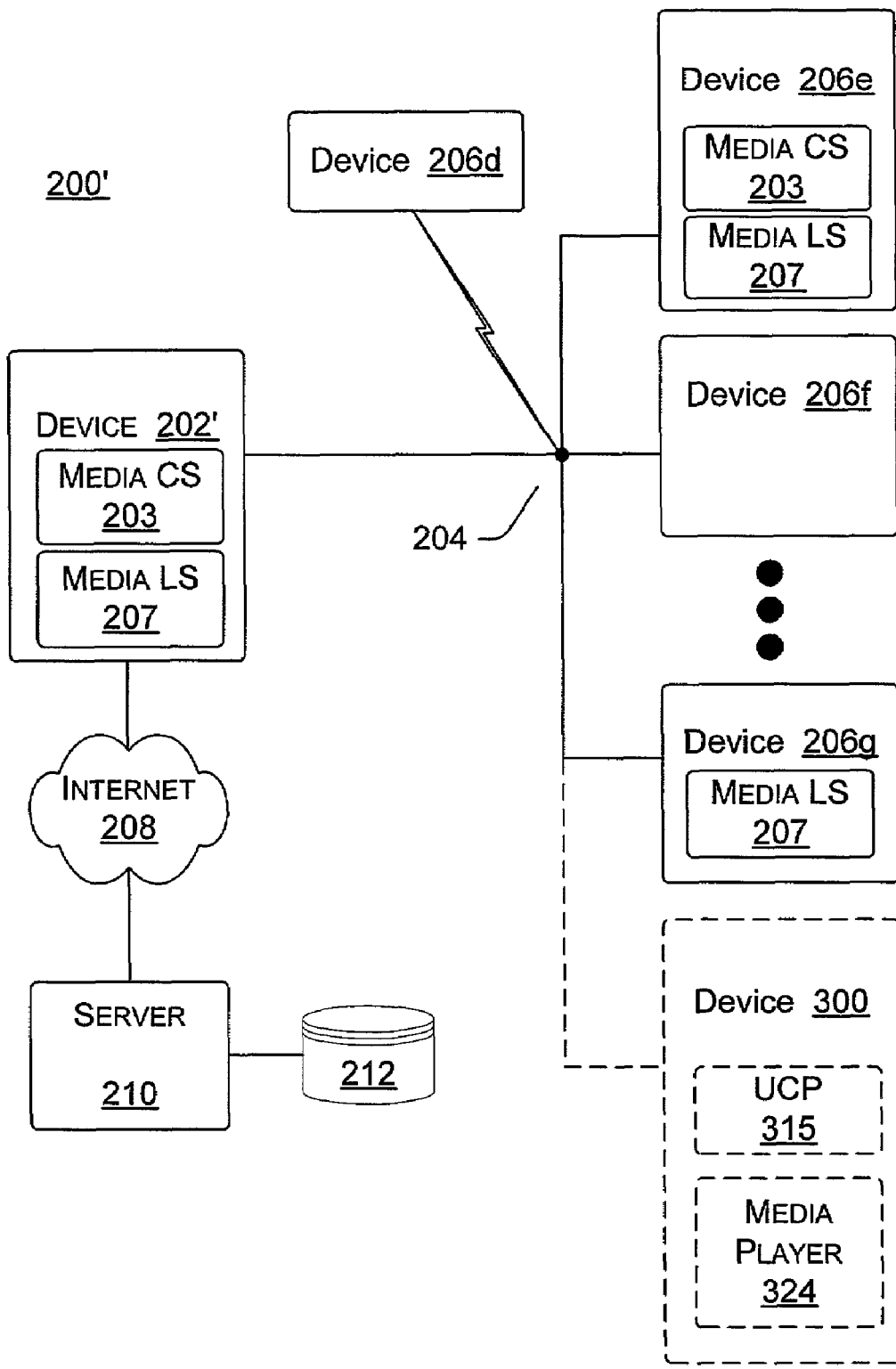
FIG. 2B is a block diagram depicting a media content sharing environment having a plurality of networked devices including at least two devices configured to provide media cataloging services (CSs) and other devices configured to provide media library services (LSs), in accordance with certain other exemplary implementations of the present invention.

FIG. 2B is a block diagram depicting a similar media content sharing environment 200' having a plurality of networked devices including at least two devices, 202' and 206e, configured to provide media cataloging services (CSs), one device 206g configured to provide media library services (LSs), and two other devices, 206f and 206h configured as media playing devices, in accordance with certain other exemplary implementations of the present invention.

FIG. 2 illustrates that a plurality of media CS 203 and media LS 207 may be provided in the content sharing arrangement. In certain preferred implementations, only one of the media CSs will be active in generating a media catalog. Thus, for example, the first device with media CS 203 to join network 204 will be operative in gathering metadata and publishing the corresponding media catalog. If the first device leaves network 204, then the next senior media CS 203 will take over the cataloging function. If no media CS 203 is on network 203, then playing devices 206b and 206h will need to access the media library 207 provided by device 206g.

Reference is now made to FIG. 3, which is a block diagram illustrating certain features and/or functions associated with certain devices, e.g., as in FIGS. 1, and/or 2A-B, that are configured to share media content, in accordance with certain exemplary implementations of the present invention.

As shown, device 202 includes a media CS 203 and has generated at least one media catalog 205. Device 206 is provided with a media LS 207 and other functions as described below. A device 300 is also shown. Device 300 is representative of a device that is configured to play (or otherwise process) shared media content. Devices 202, 206 and 300 are operatively interconnected, for example, through a network (not shown) like network 204.

To illustrate certain features of these devices, an exemplary media content selection and playing process is illustrated by the arrows between blocks. Each of the arrows includes a circle with a number that is used for the demonstrative purposes of this description. While these arrows denote a certain sequence of events/acts, it should be understood that the actual implementation of such functions and logic will likely have a different sequencing of events/acts, and will likely perform many of these simultaneously and or include other events/acts too.

With this in mind, an exemplary media content selection and playing process will now be described. Act #0 is illustrated in a network device manager 302 provided, in this example, by device 206. Provided by network device manager 302, is a registration process 304. As part of act #0 device 300 is registered as part of the network. Registration information is maintained in a network store 306.

In act #1, the media LS 207 of device 206 provides metadata to media CS 203 shown here in device 202. Media CS 203 generates at least one media catalog 205, which is discovered by a network interface 314 of device 300 in act #2. Network interface 314, for example, may include or otherwise work with a UPnP User Control Point (UCP) 315. Device 300 is able to query media CS 203 as shown in act #3 and results of the query are provided in act #4. By way of example, a query of the media catalog for music could result in one or more matches that are identified by a URL and/or UNC associated with the location of the applicable media content files available through device 206.

In act #5, the information for the media content files is provided by the network interface to a client process 316 within device 300. Within this exemplary client device 316 is a Hyper Text Transfer Protocol (HTTP) client 318 configured to provide input/output functionality for device 300 in support of the sharing of media content. Here, in act #6, HTTP client 318 requests a selected media content file. For example, an HTTP GET (URL) or File 10 (UNC) command may be used. The request is handled by a corresponding content server 320 within device 206. Content server 320 accesses the selected media content file, which in this example, is stored in content database 322. The media content is provided to content server 320 as illustratively represented by act #7. Content server 320 provides the media content to HTTP client in act #8.

Client 316 has now received the selected media content file from device 206 over network 204 (e.g., FIG. 2A). In act #9, the media content file is provided to a media decoder/player function 324, which attempts to decode the file and play it. If media decoder/player function 324 does not have a necessary license for the media content file, should it be protected, then in act #10 a corresponding license request is initiated by license client 326. License client 326 request a media playing license from a license generator 312 of network device manager 302 of device 202. Here, for example, the media playing license request may include a request for a portable media license by identifying the serial number of the media content and possibly other identifying information about device 300 and/or the user. In act #12, the request information is provided to network store 306, which looks up registration information based on the serial number, for example. In act #13 the registration information/result is provided to license generator 312. If the license generator is satisfied that device 300 is properly registered, then in act #14, license generator 312 requests a license from a DRM client 316. DRM client 316 determines if a license is available and returns the license to license generator 312. License generator 312 then provides the license to license client 326, in act #15. The license is then provided to media decoder/player 324, which can then proceed with the decoding and playing of the media content file.

Attention is now directed towards the flow diagram depicted in FIG. 4. This flow diagram depicting a media sharing process 400, in accordance with certain exemplary implementations of the present invention.

In step 402, a media CS 203 is created on at least one device that is coupled to network 204. In step 404, media CS 203 sends a request for available media information over network 204. At least one media LS 207 operating on a device coupled to network 204 receives the request and in response sends media library information to media CS 203, as shown in step 406. In step 408, media CS 203 receives the media library information from media LS 207 and forms media catalog. Media CS 203, in step 410, sends out a notification that the media catalog is available.

Next, in step 412, media CS 203 sends at least a portion of the media catalog over network 204 to at least one networked device, e.g., upon request. In step 414, the networked device provides information about selected media content identified in the media catalog to a user for possible selection. In step 416, the user selects media content identified in the media catalog. Subsequently, in step 418, the networked device requests the selected media content over network 204 from an applicable media content holding/serving device, which provides the selected media content in step 420.

An Exemplary Home Network Arrangement

In accordance with certain aspects of the present invention, the methods and apparatuses described above form a system for sharing media files and media licenses via a home network. In certain implementations, the system includes content server 320, license generator 312, media library service 207, media catalog 205, and a user control point (UCP) 315 and media player 324 provided by device 300.

In this exemplary implementation content server 320 stores media content files on a storage medium such as a hard disk. Content server 320 shares media content files via network protocols such as SMB, HTTP or FTP. In this example, license generator 312, network store 306 and DRM client 316 work together as a license server that stores and selectively provides applicable media licenses to license clients, such as, license client 326.

The license server in certain implementations issues a derived media license required to enable media player 324 to play a media content file. The derived license preferably has restrictions such as a time limit (e.g., 1 hour, 24 hours, etc.) during which the media content file may be played. Issuing a derived license typically has side effects on the original license. For example, the original license may permit issuing one derived license per day.

The media library includes metadata for a set of media content files and associated media licenses. In certain implementations, the media library includes information about the location, format and network protocols required to access each media content file. The media library also contains information about where to obtain the media license that is required to play a media content file. Additionally, in certain implementations, the media library includes information such as author, title, genre, etc., that may be used to conduct searches to find particular types of media content files.

One advantageous feature of the media library in this exemplary arrangement is the ability to uniquely identify media content items. Here, for example, media library service 207 can be configured to recognize that there may be duplicate copies of a media content file stored in multiple locations. Thus, media library service 207 could use a hash value from a collision resistant hash algorithm, such as, e.g., Secure Hash Algorithm version 1 (SHA1) or the like, to detect identical copies of a media file stored in multiple locations. Media library service 207 can look up the hash value in an Internet connected database/service, for example, to find the metadata associated with the media content file. Media player 324, for example, can also use the media file hash value to verify the integrity of the media file prior to playback. The media content item may also be available in multiple versions and in multiple file formats. In some cases, media library service 207 may be unable to find the media file hash value in an Internet connected database/service. In this case, media library service 207 could generate a media fingerprint for the media content file. Media library service 207 could then lookup the media fingerprint in an Internet connected database/service to get the metadata for the media library.

Media catalog service 203 aggregates metadata from multiple media libraries to enable efficient searches for media items available on the home network. Media catalog service 203 can make a cached copy of the metadata from multiple media libraries. Media catalog service 203 may also/instead implement a distributed query mechanism that merges the search results from multiple media libraries.

The user control point provided in this example by device 300 would provide the user interface for searching the media catalog, browsing the search results, selecting a media item for playback, etc. The user control point would select a media content file, e.g., by URL/etc., that has a compatible format and uses a supported network protocol. Thus, for example, the client 316 eventually provides the URL, license information, metadata, or other like information to media player 324.

Media player 324 having received this information downloads the media content file from content server 320. The media content file may be stored in a local storage mechanism (not shown), for example. Media player 324 may then use the media file hash value to verify the integrity of the downloaded media content file. Media player 324 using license client 326 would then contact license generator 312 to obtain the appropriate license to play the media content file.

In accordance with certain further aspects of the present invention, network related parameters may also be included within the metadata. Such additional information may, for example, be used by a software agent or other like capability provided on the device with the music catalog. Here, the agent could be configured to determine the network requirements for playing back the media content. Doing so would allow the agent to recommend adaptive actions to optimize the quality, speed, etc., of the media playback on the destination device, e.g., based on one or more measures using the network diagnostic information dynamically available to the agent. Some exemplary adaptive actions include: content transcoding to the right format, rate, compression, etc.; media used for content transfer (wired, wireless); best source of the content, if there are more than one; and, determining ahead of time if playing the media content would likely be impossible or otherwise unacceptable given the network condition, and notifying the client device.

Although some preferred implementations of the various methods and systems of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A system to share media content stored on a home network among devices of the home network, the system comprising:

a processor; and memory accessible to the processor, the memory comprising:

a content database storing media content files available for sharing among the devices of the home network, the home network utilizing universal plug-and-play (UPnP) protocols;

a media library service to provide metadata associated with the media content files available for sharing to a media catalog service;

a content server to:
receive a request from a home network device to access a particular media content file;
retrieve the particular media content file from the content database; and
send the particular media content file to the home network device;

a digital rights management client to:
determine whether an original media playing license associated with the particular media content file is available; and
generate a temporary media playing license from the original media playing license, the temporary media playing license specifying restrictions relating to playback of the particular media content file via the home network device; a license generator to:
receive a request from the home network device for a media playing license relating to the particular media content file;
determine whether the home network device is properly registered;
send a request to the digital rights management client for the temporary media playing license relating to the particular media content file when the home network device is properly registered; and
send the temporary media playing license to the home network device.

2. The system as recited in claim 1, wherein the media catalog service is configured to gather additional metadata associated with additional media content which is available for sharing from one or more of the devices of the home network, to generate a media catalog using the metadata and the additional metadata, and to output the media catalog over the home network.

3. The system as recited in claim 2, wherein the media catalog service is configured to query a respective media library service of each of the one or more of the devices of the home network about information associated with the additional media content which is available for sharing.

4. The system as recited in claim 2, wherein the media catalog service is configured to convert at least a portion of the metadata, at least a portion of the additional metadata, or a combination thereof, to produce the media catalog in the form of a markup language file selected from a group of different types of markup language files comprising a HyperText Markup Language (HTML) file, a Standard Generalized Markup Language (SGML) file, an Extensible HyperText Markup Language (XHTML) file, an Extensible Markup Language (XML) file, a Wireless Markup Language (WML), a Handheld Device Markup Language (HDML) file, a Cold-Fusion Markup Language (CFML) file, and a Compact HyperText Markup Language (CHTML) file.

5. The system as recited in claim 1, wherein the metadata includes at least one type of information selected from a set of different types of information that includes media content location information, media content format information and media content descriptive information.

6. The system as recited in claim 5, wherein the media content location information includes at least one location identifier selected from a group of location identifiers comprising a uniform naming convention (UNC) identifier and a unified resource locator (URL) identifier.

7. The system as recited in claim 1, wherein
the content server is operatively configured to output selected media content over the home network, and
wherein the memory comprises
a media player to play the media content files stored at the media content database.

8. The system as recited in claim 7, wherein the selected media content is identified over the home network using at least one location identifier selected from a group of location identifiers comprising a uniform naming convention (UNC) identifier and a unified resource locator (URL) identifier.

9. The system as recited in claim 7, wherein the media player is further configured to verify integrity of the particular media content file based on a hash value associated with the particular media content file.

10. The system as recited in claim 1, wherein the license generator is configured to determine whether the home network device is associated with at least one registered device for an entity associated with the original media playing license.

11. The system as recited in claim 10, wherein the entity is selected from a group of entities including a user, an account, a group of users, a group of accounts, an organization, a group of organizations, a company, a group of companies, all users, all accounts, all organizations, and all companies.

12. The system as recited in claim 10, wherein the license generator is configured to receive unique device identifying information from the home network device and determine if the unique device identifying information matches previously registered device identifying information.

13. The system as recited in claim 1, wherein the temporary media playing license is a portable media license.

14. The system as recited in claim 1, wherein the content server is configured to provide the particular media content file to the home network device using at least one data transferring technique selected from a group of data transferring techniques comprising a file transfer protocol (FTP) technique, a streaming media technique, and a progressive download technique.

15. The system as recited in claim 1, wherein a media player of the home network device is configured to play the particular media content file when provided with the temporary media playing license.

16. The system as recited in claim 1, wherein a specified entity is assessed a monetary fee in return for the temporary media playing license.

17. The system as recited in claim 1, wherein the media content files stored at the content database include at least one type of media data selected a group of different types of media data comprising audio data, video data, image data, multimedia data, graphic data, textual data, graphical user interface (GUI) data, interactive programming data, computer game data, and virtual reality data.

18. The system as recited in claim 1, wherein the home network device includes a desktop computing device, a notebook computing device, a tablet computing device, a handheld computing device, a personal digital assistant (PDA) device, an electronic paper device, an electronic book device, a wearable computing device, a digital audio receiver (DAR) device, a digital audio player device, a digital audio recording device, an automobile-based media player device, a digital television device, a digital video player device, a digital versatile disc (DVD) player device; a set top box device, a digital video receiver device, a digital video recording device, a wireless communication device, or any combination thereof.

19. The system as recited in claim 1, wherein the media library service is further configured to uniquely identify the media content files available for sharing using a hash algorithm.

20. The system as recited in claim 19, wherein the hash algorithm includes a Secure Hash Algorithm (SHA).

21. The system as recited in claim 19, wherein the media holder media library service is further configurable to access information about the particular media content file based on a hash value associated with the particular media content file.

22. The system as recited in claim 21, wherein the media library service is further configurable to access metadata associated with the particular media content file based on the hash value associated with the particular media content file.

* * * * *